US005872640A

United States Patent [19]
Cohen et al.

[11] Patent Number: 5,872,640
[45] Date of Patent: Feb. 16, 1999

[54] FACSIMILE FORM GENERATION SYSTEM

[75] Inventors: Larry Cohen, Silver Spring, Md.; Paul McDonald, Ashburn, Va.; William J. Ashcraft, Rockville, Md.

[73] Assignee: Cable & Wireless, Inc., Vienna, Va.

[21] Appl. No.: 753,248

[22] Filed: Nov. 22, 1996

Related U.S. Application Data

[60] Provisional application No. 60/007,645 Nov. 28, 1995.

[51] Int. Cl.⁶ ........................................................ H04N 1/00
[52] U.S. Cl. .......................... 358/434; 358/403; 358/442; 707/508; 707/514
[58] Field of Search ..................... 358/400, 402, 358/404, 434, 438, 444, 450, 403, 424, 425, 442, 468, 460; 395/766, 767, 768, 769, 784; 707/505, 506, 507, 508, 509, 514, 516, 517, 522, 523, 104

[56] References Cited

U.S. PATENT DOCUMENTS

| | | | |
|---|---|---|---|
| 4,918,723 | 4/1990 | Iggulden et al. | 379/100 |
| 4,941,685 | 7/1990 | Anderson | 282/1 R |
| 5,006,992 | 4/1991 | Skeirik | 364/513 |
| 5,008,810 | 4/1991 | Kessel et al. | 707/506 |
| 5,025,396 | 6/1991 | Parks et al. | 707/506 |
| 5,231,510 | 7/1993 | Worthington | 358/400 |
| 5,243,437 | 9/1993 | Millman et al. | 358/406 |
| 5,267,303 | 11/1993 | Johnson et al. | 379/100 |
| 5,287,444 | 2/1994 | Enescu et al. | 707/507 |
| 5,299,305 | 3/1994 | Oomae et al. | 707/506 |
| 5,325,303 | 6/1994 | Walz et al. | 364/464.02 |
| 5,327,341 | 7/1994 | Whalen et al. | 364/413.01 |
| 5,404,231 | 4/1995 | Bloomfield | 358/400 |
| 5,404,294 | 4/1995 | Karnik | 364/419.1 |
| 5,416,849 | 5/1995 | Huang | 382/173 |
| 5,450,537 | 9/1995 | Hirai et al. | 707/507 |
| 5,465,167 | 11/1995 | Cooper et al. | 358/468 |
| 5,487,141 | 1/1996 | Cain et al. | 395/135 |
| 5,495,565 | 2/1996 | Millard et al. | 395/147 |
| 5,495,581 | 2/1996 | Tsai | 395/154 |
| 5,544,285 | 8/1996 | Glaser et al. | 395/149 |
| 5,557,723 | 9/1996 | Holt et al. | 707/506 |
| 5,563,999 | 10/1996 | Yaksich et al. | 395/149 |
| 5,572,601 | 11/1996 | Bloomberg | 382/175 |
| 5,608,898 | 3/1997 | Turpin | 395/619 |

OTHER PUBLICATIONS

International Search Report—(3) pages.

*Primary Examiner*—Edward L. Coles
*Assistant Examiner*—Madeleine AV Nguyen
*Attorney, Agent, or Firm*—Finnegan, Henderson, Farabow, Garrett & Dunner, L.L.P.

[57] ABSTRACT

Document generation and delivery system that allows a user to download a plurality of sets of data to a document preparation system. The document preparation system has a memory that stores pre-defined forms with a plurality of fields. The downloaded data begins with a definition of the order in which data will be sent for use in filling in the fields of a form. The data sets are then used to populate fields in the form thereby generating documents to be transmitted via facsimile to a plurality of destinations.

22 Claims, 5 Drawing Sheets

F & M Securities

| Name: | Account: |
| --- | --- |
| Field 1 | Field 2 |
| Facsimle Number:  Field 2 | |

Stock:

Field 3

Message:

Field 4

Fig. 2A

F & M Securities

| Name: | Account: |
|---|---|
| John Smith | 56789 |
| 202-123-45678 | |

Stock:

Cable: $35879

Message:

The latest stock
trade information.

Fig. 2B

FACSIMILE FORM GENERATION SYSTEM

CROSS REFERENCE TO RELATED APPLICATIONS

This application claims the benefit of provisional application "Facsimile Form Generation," filed Nov. 28, 1995, bearing Ser. No. 60/007,645, the contents of which are relied upon and incorporated by reference.

BACKGROUND OF THE INVENTION

1. Field of Invention

The present invention relates to a document preparation and delivery system, and more particularly to a system and method for preparing and sending documents via facsimile to a plurality of customers, each customer document having a plurality of unique data values.

Although applicable for many applications, the present invention is particularly suitable for stock brokerage and security firms and will be described in that connection.

2. Description of the Related Art

Many businesses require sending information to clients on a regular basis and in a very timely manner. For example, in the stock brokerage and securities area, a brokerage firm is required by law to send confirmation of stock trades to their clients in less than one calendar day. Because the cost of overnight mail carriers is prohibitive, other options such as facsimile delivery are used.

However, it is extremely time consuming for a firm to prepare and send via facsimile a large number of documents to a plurality of different telephone numbers. In one system, a facsimile vendor stores a customer form. Then the securities firm sends in data which is typed at distinct locations to fit the form. That is, for example, the name to be placed in the "to" field is positioned on the client's screen in the exact position it will be on the form. If there are a plurality of blank lines then a plurality of blank lines will be sent. This requires a great deal of data to be sent from the client to the fax vendor, who then superimposes the data over the stored form and transmits the facsimile to a plurality of different customer sites. Accordingly, this prior system required that a securities firm send a large amount of data to a fax vendor and spend a great deal of time preparing and formatting the data.

In light of the foregoing, there is a need for a facsimile system where the firm may send a minimal amount of information in a simplified format to a fax vendor, saving both time and money for the securities firm.

SUMMARY OF THE INVENTION

Accordingly, the present invention is directed to a computer readable medium that includes data corresponding to a pre-formatted form having a group of fields arranged at designated locations on the form, and having instructions configured to extract information from received data that includes a key value section and a data section. The key value section defines the order of the field data that will follow in the data section. The fields in a form are populated with the received data in the corresponding fields defined by the key value section. The data section may include data for a plurality of separate forms. Common data information that is to be included in each form may be defined in the key value section and inserted in each form to be transmitted.

In another aspect, a system for facsimile transmission of documents includes a memory for storing a form with a plurality of fields, structure for receiving data identifying a pre-formatted form having fields, data defining a sequence that data will be sent for insertion into fields in the pre-formatted form, structure for populating the fields with received data and then transmitting the generated facsimiles.

In another aspect, a method for preparing documents for facsimile transmission includes the steps of receiving sets of data from an external device that each corresponds to a stored pre-formatted form. The data values in each data set are used to populate a form to generate a completed document. The completed documents are output via facsimile.

BRIEF DESCRIPTION OF THE DRAWINGS

The accompanying drawings, which are incorporated and constitute part of the specification, illustrate a presently and preferred implementation of this invention and, together with the general description given above and the detailed description of the preferred implementation given below, serve to explain the principles of the invention.

In the Drawings:

FIG. 2A shows an example of a pre-formatted form that may be used by the system of FIG. 1;

FIG. 2B shows an example of a completed form generated by the system of FIG. 1;

DETAILED DESCRIPTION OF THE INVENTION

Reference will now be made in detail to the construction and operation of a preferred implementation of the present invention which is illustrated in the accompanying drawings. The following description of the preferred implementation of the present invention is only exemplary of the invention. The present invention is not limited to this implementation, but may be realized by other implementations.

Figure 1:
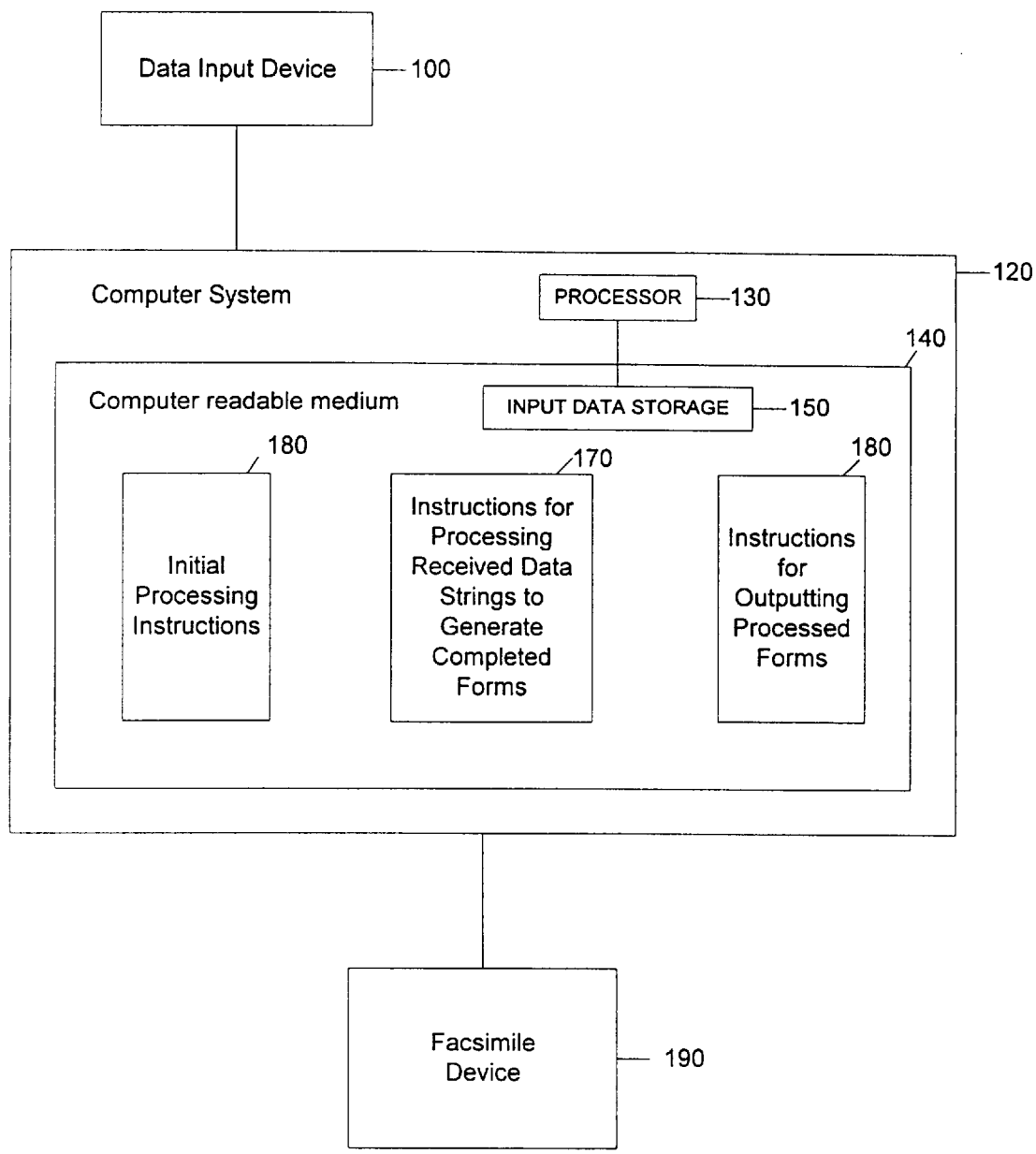
FIG. 1 is a block diagram of a system for preparing documents for facsimile transmission according to the present invention.

FIG. 1 illustrates one implementation of the present invention. The data input device 100 inputs data to a computer system 120 that includes processor 130, computer readable medium 140, input data storage 150, initial processing instructions 160, instructions for processing received data strings to generate completed forms 170, and instructions for outputting processed forms 180. The computer system may output information through a facsimile device 190. The computer readable medium may be a computer memory or any other computer readable device.

The input data storage 150 stores data corresponding to a pre-formatted form having a group of fields at designated locations in the pre-formatted form. The example pre-formatted form is shown in FIG. 2 and has a title, F&M Securities, a field 1 for insertion of a name, a field 2 for insertion of account information, a field 3 for insertion of stock information, and a field 4 for insertion of a message. The initial processing instructions 160 include instructions for receiving and storing information about preformatted forms in the input data storage 150.

Figure 3:
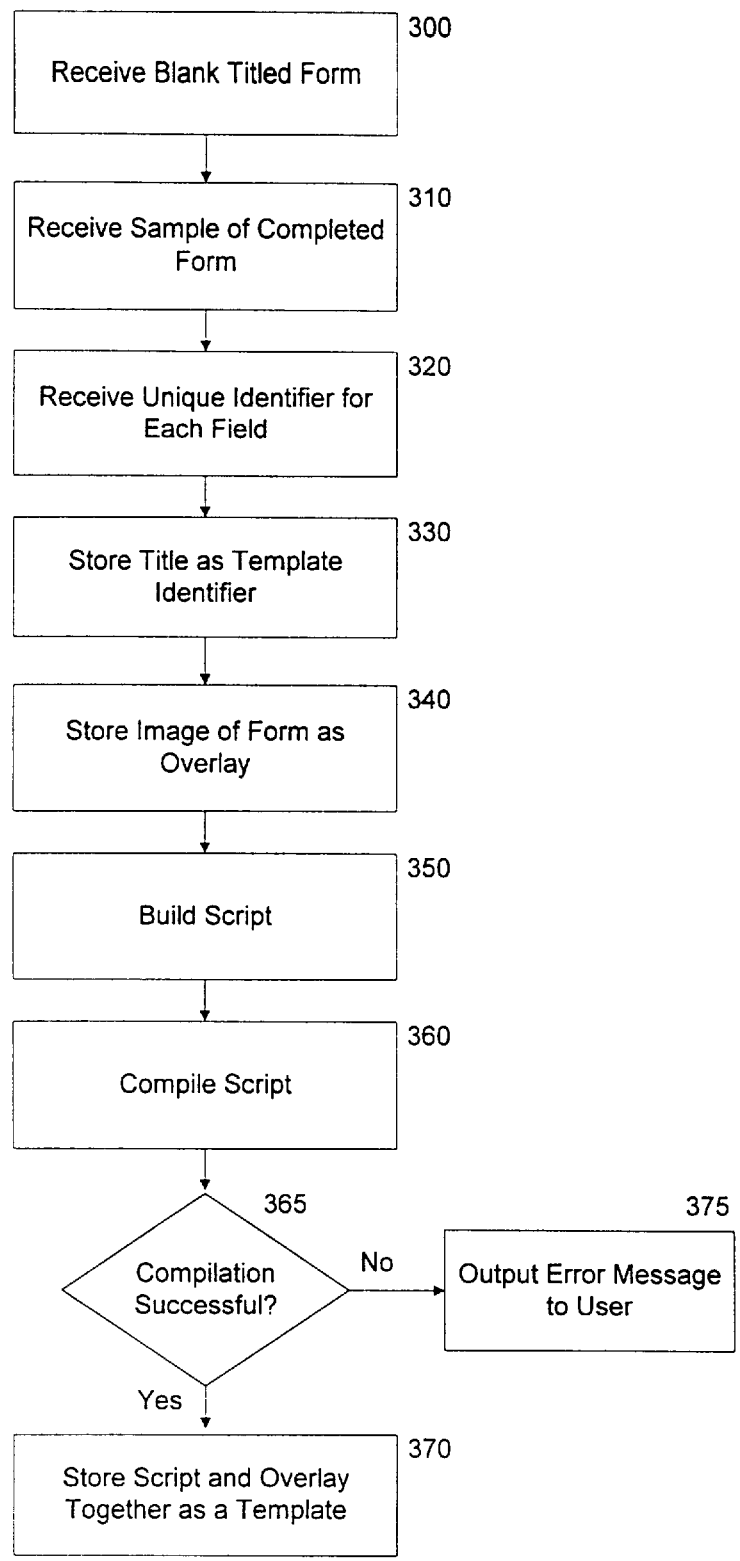
FIG. 3 is a flow chart of the steps required to configure the system for the preparation of facsimile documents for transmission by the system of FIG. 1.
Figure 4:
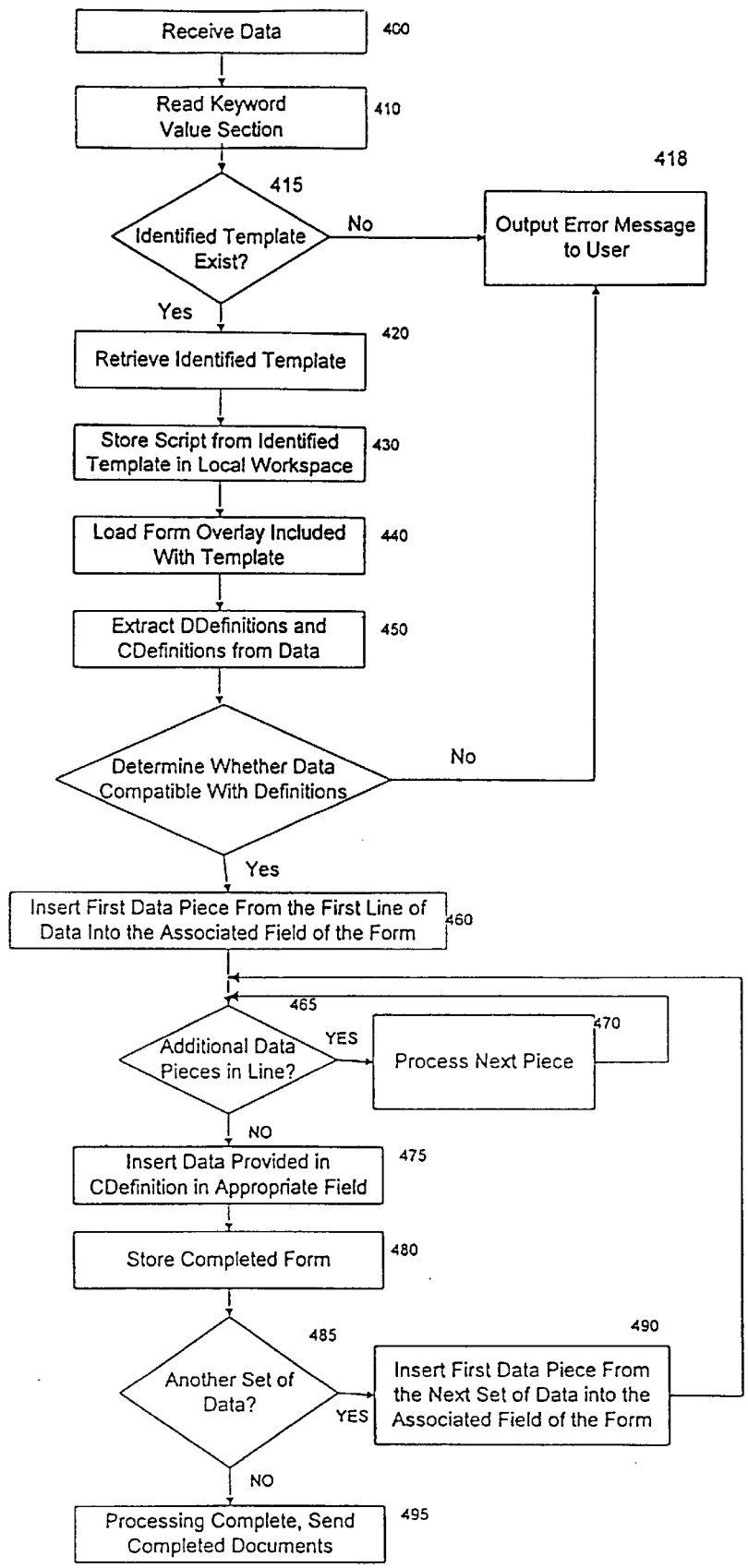
FIG. 4 is a flow chart of the steps for processing received data to generate documents for facsimile transmission by the system of FIG. 1 configured according to FIG. 3.

Initially customer companies such as F&M Securities, supply a business form to the facsimile vendor such as that shown in FIG. 2A, and a sample of how the form should appear after being printed such as that shown in FIG. 2B. FIG. 3 shows the steps for creating the initial forms that are stored in the input data storage 150. The blank titled form is received (step 300), and a sample of the completed form such as that shown in FIG. 2B is received (step 310). A unique field identifier must be provided for each field in the form (step 320). The title of the form, or some other designated identifier is stored as a template identifier (step 330). An image of the form is stored as an overlay (step 340). The image of the form may be generated by drawing the document to scale using page layout software such as FrameMaker made by Adobe running on an operating system such as Solaris made by Sun Microsystems, Inc. The present invention utilizes a script, which is a program that describes how text and graphics are to be combined with one or more overlays to produce a document. The script includes instructions for where to place each field on an overlay and includes formatting information defining how data is to be placed and appear in each field. For example, the script will define the location of the name field on the document page and may describe a location of fields in relation to one another. An overlay is a one page pre-stored raster image used as a background on a fax with form data, and a template is a collection of a script and zero or more overlays.

A script may be created using a basic understanding of programming languages and using any programming language such as Xbase, dBase, Clipper, LISP, BASIC and Microsoft's Visual Basic.

The script is compiled (step 360) and, when the compilation is determined to be successful, the script and overlay are stored together as a template (step 370). Otherwise an error message is output to the user of computer system 210 (step 375). The compiling step is the most time consuming step. Therefore, it is desirable to precompile the script or to place the compiler on another computer system separate from computer system 210.

After templates have been stored in the input data storage 150, a customer may download data to the present invention in a variety of ways using communication programs such as ProComm communications software produced by Quarterdeck Inc. (step 400). The instructions for processing received data strings 170 parse through received data strings from data input device 100, and populate a group of fields in an identified pre-formatted form. The following is an example of a received data string having a keyword value section and a data section:

---

Keyword Value Section

---

Template: F&M_Securities
DDEFINITION: FAX, NAME, ACCT, STOCK
CDEFINITION: MESSAGE
Data Section

| The latest stock trade information. | (Common Data) |
| 202-123-4567; John Smith, 56789, Cable: $35879; | (Data Set 1) |
| 202-124-5678; Jennifer Thomas, 54321, Enterprise: $40000; | (Data Set 2) |

---

Computer system 120 receives the data and processor 130 extracts a keyword value section (step 410). Computer system 120 first determines whether the template identified exists (step 415). If not, an error message is output to the user (step 418). Otherwise, the identified template is retrieved (step 420). The script associated with the identified template is stored in a local work space in the computer system 120 (step 430). Form overlays associated with the identified template is loaded into the local work space of the computer system 120 as they are referenced by the script (step 440).

Data definitions (DDEFINITIONS) and common data definitions (CDEFINITIONS) that are included in the keyword value section are extracted (step 450). The DDEFINITIONS provides a list of comma separated field names that are in the form. In one embodiment, the first few field names in the DDEFINITION are reserved names for information such as a phone number destination for a facsimile. The CDEFINITION lists comma separated field names that will contain common data. For example, if a firm wishes to include the same message of the day in each facsimile, this message of the day will be inserted in the section referred to as common data. The data section includes data pieces separated by commas. Each data piece corresponds to a field on the identified corresponding form. The list of fields in the CDEFINITION and DDEFINITION defines the order of the data in the data section.

In the example above, the CDEFINITION indicates that the message field 4 of each form to be defined in the data section will contain the same message. The data section begins with data for insertion in the common data fields defined in the CDEFINITION. The DDEFINITION shown above indicates that each data set will list a fax number followed by a name for field 1, account number for field 2, and stock information for field 3.

The data section includes two data sets after the defined common data, each set corresponding to a different form. The sets are distinguished by being on different lines or by a character such as ";" or "/." In the example, there are two data sets, one data set corresponding to a form to be sent to John Smith and the other data set corresponding to a form to be sent to Jennifer Thomas. Each set includes a data piece corresponding to each field listed in the DDEFINITION. The data pieces are separated by a character such as a comma, but any predefined character may be used. If the data has an embedded comma, it must be framed with another character such as quote marks, such as "Arlington, Virginia." The DDEFINITION shown above indicates that the data pieces will first list a facsimile number followed by a name field, an account field, and a stock field. If a field is to be left black, then two separators, such as the separator comma shown, will be listed in a row.

Computer system 320 determines whether the number of data values provided in each data set correspond to the number of identifiers provided in the combined CDEFINITION and DDEFINITION areas (step 412). If not, an error message is output to the user (step 418). Otherwise, based on the DDEFINITION, the first data piece from the first line of data of the first set of data is inserted in the associated field of the form (step 460). The computer system 120 determines whether there are additional data pieces in the data set (step 465). If so, the next piece of data, which belongs in the next identified field, will be inserted (step 470). When it is determined that there are no additional data pieces in the data set (step 465), then data provided in the CDEFINITION is inserted in the appropriate field in the form. In the example, the message "The latest stock trade information." is inserted in the message field of every form generated. The completed form that includes all of the data given by the user will be stored as a completed form (step 480).

If it is determined that there is another set of data (step 485), then the first data piece in that set is inserted into an associated field of the next form (step 490), where each set of data corresponds to another distinct form document.

When it is determined that there are no additional sets of data to be processed (step 485), then processing is complete and the set of completed documents are sent via facsimile to the facsimile number associated with each (step 495). If a facsimile number is busy or out of paper, the computer system 120 will repeatedly attempt to send the document until a successful connection is achieved.

In one implementation of the present invention, a customer may designate special processing at the time the script is developed in order to provide additional functions. For example, the customer may indicate that certain fields in the form will have a plurality of values. In the example shown in FIG. 2A, the customer may wish to provide a plurality of stock transactions and may wish to have the stock field repeated on the completed form. The script will include instructions for checking for a specific flag or character such as ";" which will be inserted in between values to indicate that each of the values belongs in the same field. If, at the time of initializing a script, a customer knows that a certain data field will have a plurality of data values, the script may be written with instructions to check for the plurality of data values and to either insert the many data values on one page or on additional pages as required.

Another type of special processing is to require that some customers receive a different overlay than others in which case the script will include instructions to check for a specific character that indicates to use an alternate overlay for this form.

A user may request that a certain field have text in bold, in which case the script will look for a character to indicate which fields are to be placed in bold for a specific customer, such as by placing a ";" in between values for the same field.

A user may wish to have a string of data printed on one line on the facsimile document but desire to enter the data on different lines in the data section of the download, in which case a special character may be placed at the end of the line before a return to indicate that the next line of data should continue with the current line of data. These are examples of the many types of special processing a user may desire that can be accomplished by altering the script of the present invention.

In one implementation of the present invention there are many distributed computer sites that include the software on computer system 120. The site closest to the destination of the facsimile should be used to compile the documents in order to save transmission costs.

While there has been illustrated and described what are at present considered to be a preferred embodiment and method of the present invention, it will be understood by those skilled in the art that various changes and modifications may be made, and equivalents may be substituted for elements thereof without departing from the true scope of the invention. Modifications may be made to adapt a particular element, technique, or implementation to the teachings of the present invention without departing from the spirit of the invention. Therefore, it is intended that this invention not be limited to the particular embodiment and method disclosed herein, but that the invention include all embodiments falling within the scope of the appended claims.

What is claimed is:

1. A facsimile transmission system comprising a computer readable medium, said medium including:
data corresponding to a pre-formatted form having a group of fields arranged at designated locations on the form;
instructions configured to:
populate the group of fields in response to the reception of field identifiers and associated informational data to generate a generated form having data corresponding to the designated fields, and
transmit a facsimile of the generated form.

2. A facsimile transmission system comprising a computer readable medium, said medium including:
data corresponding to a pre-formatted form having a group of fields arranged at designated locations;
instructions configured to:
extract a definition record from received data, the definition record including an ordered listing of identifiers for each of the fields being supplied in received data;
populate the group of fields, in response to the extracted definition record, with received common information and informational data, the informational data including a plurality of sets of information each set corresponding to a unique form to thereby generate a plurality of forms, wherein the common information is included in each form, and
transmit a facsimile of the generated forms.

3. A system for preparing documents for facsimile, the system having a memory for storing a form with a plurality of fields including:
means for receiving data corresponding to a stored pre-formatted form having a group of fields arranged at designated locations on the stored form;
means for populating the group of fields in response to the reception of field identifiers and associated informational data to generate a document having data corresponding to the designated field locations; and
means for transmitting a facsimile of the generated document.

4. A system according to claim 3 wherein the received data includes a recipient's facsimile telephone number and wherein said transmitting means send the generated document to the received facsimile telephone number.

5. A system according to claim 3 wherein the received data includes a plurality of sets of information, each set corresponding to a separate document and wherein the means for populating includes means for populating the form with each set of information to generate a plurality of generated documents.

6. A system according to claim 5 and wherein the received data includes common data and wherein the means for populating includes means for associating said common data with each of said plurality of generated documents.

7. A system according to claim 5 wherein at least one of said sets of information includes a flag that indicates special processing for one of the plurality of forms, the system further including means for performing the special processing.

8. A system according to claim 7 wherein the means for performing special processing includes means for changing a format of at least a portion of the form.

9. A system according to claim 7 wherein the means for performing special processing includes means for attaching an additional message to the form.

10. A system according to claim 5 wherein the sets of information are separated by a specific character and wherein the means for populating includes means for separating the plurality of fields from the data based on the special character.

11. A system according to claim 10 wherein the specific character is a comma.

12. A system according to claim 3 wherein the data includes a definition record including an ordered listing of identifiers for each of the data fields being supplied in the data.

13. A system according to claim 12 wherein the definition record includes a receiving facsimile telephone number.

14. A system according to claim 5 wherein one of the sets of information include a plurality of values for a single data field on the form, the system further including means for inserting the plurality of values in the single data field.

15. A method for preparing and sending documents including the steps of:

receiving data corresponding to a pre-formatted form having a group of fields arranged at designated locations;

populating, respectively, the group of fields in response to the reception of field identifiers and associated informational data to generate a generated form having data corresponding to the designated field locations; and transmitting a facsimile of said generated form.

16. A method according to claim 15 wherein the step of receiving data includes the step of receiving data that includes a plurality of sets of information, each set corresponding to a separate document and wherein the step of populating includes the step of sequentially populating the form with each set of information to generate a plurality of documents.

17. A method according to claim 16 wherein the received data includes common data and wherein the step of populating includes the step of associating said common data with each of said plurality of generated forms.

18. A method according to claim 16 wherein at least one of said sets of information includes a flag that indicates special processing for one of the plurality of forms, the method further including the step of performing the special processing.

19. A method according to claim 18 wherein the step of performing special processing includes the step of changing a format of at least a portion of the form.

20. A method according to claim 18 wherein the step of performing special processing includes the step of attaching an additional message to the generated form.

21. A method according to claim 16 wherein the pieces of information are separated by a specific character and wherein the step of associating includes the step of separating the plurality of fields from the data based on the special character.

22. A method according to claim 16 wherein one of the pieces of information includes a plurality of values for a single data field on the form, the method further including the step of inserting the plurality of values in the single data field.

* * * * *

(12) EX PARTE REEXAMINATION CERTIFICATE (8841st)
United States Patent
Cohen et al.

(10) Number: US 5,872,640 C1
(45) Certificate Issued: Feb. 7, 2012

(54) FACSIMILE FORM GENERATION SYSTEM

(75) Inventors: Larry Cohen, Silver Spring, MD (US); Paul McDonald, Ashburn, VA (US); William J. Ashcraft, Rockville, MD (US)

(73) Assignee: Xpedite Systems, LLC, Atlanta, GA (US)

Reexamination Request:
No. 90/011,786, Jul. 26, 2011

Reexamination Certificate for:
Patent No.: 5,872,640
Issued: Feb. 16, 1999
Appl. No.: 08/753,248
Filed: Nov. 22, 1996

Related U.S. Application Data
(60) Provisional application No. 60/007,645, filed on Nov. 28, 1995.

(51) Int. Cl.
*H04N 1/00* (2006.01)

(52) U.S. Cl. .................. 358/434; 358/403; 358/442; 715/236; 715/277

(58) Field of Classification Search .................. None
See application file for complete search history.

(56) References Cited

To view the complete listing of prior art documents cited during the proceeding for Reexamination Control Number 90/011,786, please refer to the USPTO's public Patent Application Information Retrieval (PAIR) system under the Display References tab.

*Primary Examiner* — Charles Craver

(57) ABSTRACT

Document generation and delivery system that allows a user to download a plurality of sets of data to a document preparation system. The document preparation system has a memory that stores pre-defined forms with a plurality of fields. The downloaded data begins with a definition of the order in which data will be sent for use in filling in the fields of a form. The data sets are then used to populate fields in the form thereby generating documents to be transmitted via facsimile to a plurality of destinations.

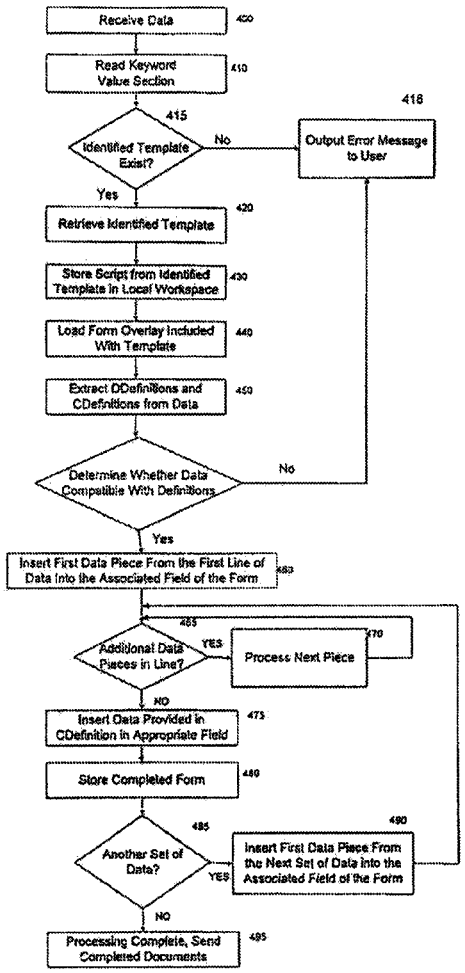

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-22 is confirmed.

* * * * *

(12) EX PARTE REEXAMINATION CERTIFICATE (9723rd)
United States Patent
Cohen et al.

(10) Number: US 5,872,640 C2
(45) Certificate Issued: Jun. 26, 2013

(54) FACSIMILE FORM GENERATION SYSTEM

(75) Inventors: Larry Cohen, Silver Spring, MD (US); Paul McDonald, Ashburn, VA (US); William J. Ashcraft, Rockville, MD (US)

(73) Assignee: Xpedite Systems, LLC, Atlanta, GA (US)

Reexamination Request:
No. 90/012,217, May 1, 2012
No. 90/012,659, Sep. 14, 2012

Reexamination Certificate for:
Patent No.: 5,872,640
Issued: Feb. 16, 1999
Appl. No.: 08/753,248
Filed: Nov. 22, 1996

Reexamination Certificate C1 5,872,640 issued Feb. 7, 2012

Related U.S. Application Data

(60) Provisional application No. 60/007,645, filed on Nov. 28, 1995.

(51) Int. Cl.
*H04N 1/00* (2006.01)

(52) U.S. Cl.
USPC .......... 358/434; 358/403; 358/442; 715/236; 715/277

(58) Field of Classification Search
None
See application file for complete search history.

(56) References Cited

To view the complete listing of prior art documents cited during the proceedings for Reexamination Control Numbers 90/012,217 and 90/012,659, please refer to the USPTO's public Patent Application Information Retrieval (PAIR) system under the Display References tab.

*Primary Examiner* — Christina Y Leung

(57) ABSTRACT

Document generation and delivery system that allows a user to download a plurality of sets of data to a document preparation system. The document preparation system has a memory that stores pre-defined forms with a plurality of fields. The downloaded data begins with a definition of the order in which data will be sent for use in filling in the fields of a form. The data sets are then used to populate fields in the form thereby generating documents to be transmitted via facsmile to a plurality of destinations.

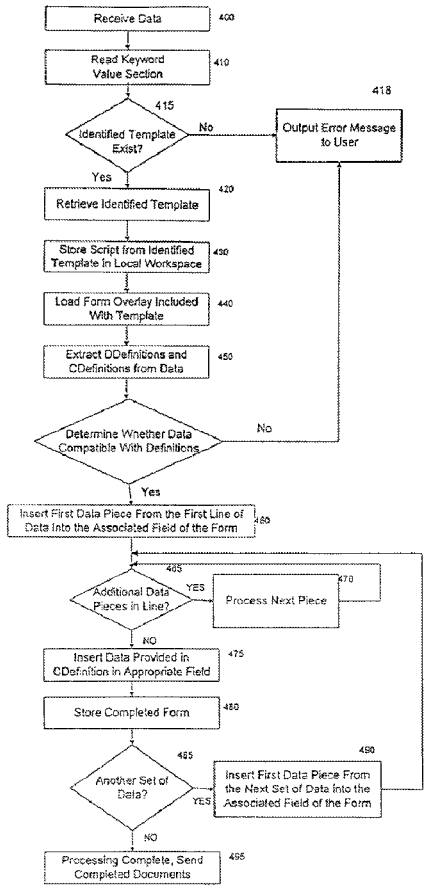

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-9, 11-20 and 22 is confirmed.

Claims 10 and 21 are determined to be patentable as amended.

New claims 23-39 are added and determined to be patentable.

10. A system according to claim 5 wherein the sets of information are separated by a specific character and wherein the means for populating includes means for separating the plurality of fields from the data based on the [special] *specific* character.

21. A method according to claim 16 wherein the pieces of information are separated by a specific character and wherein the step of associating includes the step of separating the plurality of fields from the data based on the [special] *specific* character.

*23. The system of claim 1 wherein the received field identifiers comprise an ordered listing of identifiers for each of the fields.*

*24. The system of claim 1 wherein the instructions are further configured to attach an additional message to the form.*

*25. The system of claim 1 wherein the informational data comprise a plurality of values for a single data field on the form, the instructions further configured to insert the plurality of values in the single data field of the form.*

*26. The system of claim 1 wherein the informational data comprise a flag that indicates special processing to generate the generated form, the instructions further configured to perform the special processing.*

*27. The system of claim 1 wherein the informational data are separated by a specific character and wherein the instructions further configured to separate the informational data into the group of fields based on the specific character.*

*28. The system of claim 27 wherein the specific character is a comma.*

*29. The method of claim 15 wherein the received field identifiers comprise an ordered listing of identifiers for each of the fields.*

*30. The method of claim 15 further comprising the step of attaching an additional message to the form prior to transmitting a facsimile of the generated form.*

*31. The method of claim 15 wherein the informational data comprise a plurality of values for a single data field on the form, the method further comprising the step of inserting the plurality of values in the single data field of the form.*

*32. The method of claim 15 wherein the informational data comprise a flag that indicates special processing to generate the generated form, the method further comprising the step of performing the special processing.*

*33. The method of claim 15 wherein the informational data are separated by a specific character and wherein the method further comprises the step of separating the informational data into the group of fields based on the specific character.*

*34. The method of claim 33 wherein the specific character is a comma.*

*35. A facsimile transmission system comprising a computer readable medium, said medium including:*

*data corresponding to a pre-formatted form having a group of fields arranged at designated locations on the form;*

*instructions configured to:*

*populate the group of fields in response to receiving field identifiers and associated non-image informational data comprising a phone number destination to generate a generated form having data corresponding to the designated fields, and*

*transmit a facsimile of the generated form to the phone number destination.*

*36. The system of claim 35 wherein the received field identifiers comprise an ordered listing of identifiers for each of the fields.*

*37. The system of claim 35 wherein the instructions are further configured to attach an additional message to the form.*

*38. The system of claim 35 wherein the informational data comprise a plurality of values for a single data field on the form, the instructions further configured to insert the plurality of values in the single data field of the form.*

*39. The system of claim 35 wherein the informational data comprise a flag that indicates special processing to generate the generated form, the instructions further configured to perform the special processing.*

\* \* \* \* \*